United States Patent
Gordon et al.

(10) Patent No.: US 8,328,100 B2
(45) Date of Patent: Dec. 11, 2012

(54) UPDATING FIRMWARE BY SCANNING A PRINTED SHEET

(75) Inventors: Gerald S. Gordon, Rochester, NY (US); Patrick J. LaRocque, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 1158 days.

(21) Appl. No.: 11/734,289

(22) Filed: Apr. 12, 2007

(65) Prior Publication Data
US 2008/0256344 A1    Oct. 16, 2008

(51) Int. Cl.
*G06K 9/36* (2006.01)
*G06K 7/10* (2006.01)
*G06F 9/445* (2006.01)

(52) U.S. Cl. ............... 235/472.01; 235/462.07; 717/174

(58) Field of Classification Search ................ 358/1.15, 358/1.16; 235/462.07, 472.01; 717/174
See application file for complete search history.

(56) References Cited

U.S. PATENT DOCUMENTS

| | | | |
|---|---|---|---|
| 5,703,347 A * | 12/1997 | Reddersen et al. | 235/462.15 |
| 6,032,004 A | 2/2000 | Mirabella, Jr. et al. | |
| 7,604,175 B2 * | 10/2009 | Zhu et al. | 235/472.01 |
| 2003/0110369 A1 | 6/2003 | Fish et al. | |
| 2006/0043203 A1 | 3/2006 | Floriach et al. | |
| 2006/0114500 A1 * | 6/2006 | Ha | 358/1.15 |
| 2006/0175413 A1 * | 8/2006 | Longacre et al. | 235/462.07 |
| 2006/0274952 A1 | 12/2006 | Nakai | |

* cited by examiner

*Primary Examiner* — Benny Q Tieu
*Assistant Examiner* — Eric A Rust
(74) *Attorney, Agent, or Firm* — Gibb & Riley, LLC

(57) ABSTRACT

Embodiments herein include a method, service, apparatus, etc., that sets at least one integrated circuit board (that has programmable elements) to a programming state. When such programmable elements are set to the programming state, they are capable of being changed. Once the programmable elements are set to be changed, at least one printed sheet is scanned. The scanning can be preformed using any scanner that is operatively connected to the integrated circuit board through, for example, a processor. Again, the printed data (e.g., the barcodes or glyphs or other computer-only readable markings) on the printed sheet comprises the reprogramming data. The processor reads the barcodes or glyphs from the bitmap generated by the scanner, and executes the reprogramming data to change the logical instructions and data maintained within the programmable elements.

16 Claims, 1 Drawing Sheet

UPDATING FIRMWARE BY SCANNING A PRINTED SHEET

BACKGROUND

Embodiments herein generally relate to systems that reprogram firmware, and more particularly to methods and systems of reprogramming firmware on integrated circuit programmable memories. With embodiments herein, glyphs are scanned in and the data obtained from the glyphs is installed into the programmable memories to reprogram them.

With respect to programmable memories, U.S. Patent Publication 2003/0110369 (the complete disclosure of which is incorporated herein by reference) explains that traditional firmware includes machine instructions stored in non-volatile memory, which is typically read only memory (ROM) or flash memory. Such ROMs may include, for example EEPROMs (electrically erasable/programmable ROM), SEEPROMs (serial EEPROM) field programmable gate arrays (FPGAs), and/or a wide variety of other read only memory types.

Thus, traditional firmware is a combination of software and hardware, although the term "firmware" is also used to refer to the software itself that is written with the intention of storing it in non-volatile memory. For example, on the Intel Architecture for Personal Computers (IA-PC), system firmware is commonly referred to as the BIOS (Basic Input/Output System), which is software alone.

A typical use for firmware is to provide machine instructions that control a data processing system when it is powered up from a shut down state, before volatile memory has been tested and configured. Firmware is also commonly used to reinitialize or reconfigure a data processing system after defined hardware events and/or to handle certain system level events like system interrupts.

The process of bringing a data processing system to its operating state from a powered down state is commonly known as bootstrapping, booting up, or the boot process. Bootstrapping typically begins with one or more processors in a data processing system. Each processor tests its internal components and interfaces. After the initial processor testing, initialization of system level resources commences. In multiprocessor systems, a single bootstrap processor (BSP) may be selected to handle initializing remaining processors and to handle the system level initialization. System level initialization typically includes procedures for checking memory integrity, identifying and initializing other resources in the data processing system, and loading an operating system (OS) into memory.

Conventional firmware is typically written using a low level language (e.g., assembly language) that provides direct access to processor hardware. Thus, firmware is typically closely tied to the processor architecture of the system for which the firmware is designed. Due in part to the architecture-specific nature of the firmware, the underlying processor architecture is typically reflected in system level resources, which are initialized, configured and serviced by the firmware, in conventional data processing systems.

SUMMARY

The embodiments herein provide, in one embodiment, a method of reprogramming firmware on integrated circuit read only memories (ROM's) using reprogramming data maintained on barcodes, glyphs, etc. that are on a printed sheet. With embodiments herein, the glyphs are scanned in (using the device's scanner) and the data obtained from the glyphs is installed into the ROM's to reprogram them.

For example, in some embodiments (which can comprise methods, services, computer programs, etc.) the process first sets at least one integrated circuit board (that has the programmable elements) to a programming state. The programmable elements can comprise any hardware adapted to maintain logical instructions and/or data, such as the PROMs, EEPROMs, SEEPROMs, FPGAs etc. that are mentioned above. When such programmable elements are set to the programming state, they are capable of being changed. This change alters the logical instructions and data that the programmable elements store or represent.

Once the programmable elements are set to be changed, at least one printed sheet is scanned. The scanning can be preformed using any scanner that is operatively connected to the integrated circuit board through, for example, a processor. Again, the printed data (e.g., the barcodes, glyphs, or other computer-only readable markings) on the printed sheet comprises the reprogramming data. The processor reads the barcodes or glyphs from the bitmap generated by the scanner and executes the reprogramming data to change the logical instructions and data maintained within the programmable elements.

This "executing" of the reprogramming data comprises physically altering the programmable elements to remove previously stored logical instructions and data from the programmable elements and to install different logical instructions and data in the programmable elements. After the programmable elements are reprogrammed, the integrated circuit board is deactivated and set to a non-programming state.

An apparatus embodiment includes at least one integrated circuit board comprising the programmable read only memory elements. Again, the programmable read only memory elements comprise hardware adapted to maintain the logical instructions and/or data. Any form of processor is included with the integrated circuit board such that the processor is operatively connected to the programmable read only memory elements. At least one switch is operatively connected to the processor. This switch is adapted to set the programmable read only memory elements to the programming or non-programming state. The device also includes a scanner that is operatively connected to the processor.

Consistent with the method described above, the scanner scans at least one printed sheet that contains the printed items that comprise reprogramming data. The processor is adapted to read the reprogramming data and change the logical instructions and data maintained within the programmable read only memory elements based on the reprogramming data. When changing the logical instructions and data, the processor is adapted to physically alter the programmable read only memory elements to remove previously stored logical instructions and data from at least one of the programmable elements and to install different logical instructions and data in the programmable elements. These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

The embodiments herein provide processes, systems, services, computer programs, etc. to reprogram firmware on integrated circuit programmable read only memories (ROM's). The disclosed embodiments use reprogramming data maintained on barcodes, glyphs, etc., which are on a printed sheet. With embodiments herein, the glyphs are scanned in (using the device's scanner) and the data obtained from the glyphs is installed into the ROM's to reprogram them.

The process of updating firmware on devices that utilize electrical boards having any form of PROMs, EEPROMs, SEEPROMs, FPGAs etc. (that are mentioned above) is exhaustive, time consuming and costly. The process is exhaustive due to the amount of planning and person/hours needed to implement configuration changes on electrical boards before the product is finally shipped to the customer. The process is time consuming due to the amount of machines/configurations that personnel need to change when products are in the warehouse and ready to ship. As a result, the cost associated with delivering the product is increased dramatically due to needed firmware updates.

With embodiments herein, firmware can be updated by anyone simply by scanning a sheet of paper. This sheet of paper is uniquely coded to give the new programming for the boards using glyphs, barcodes, symbols, or other high density font using micro printing. The embodiments herein aim to make reconfiguration of programmable memories faster by giving a simple method for doing so.

In one basic setup, the user first initializes a reprogramming mode of a multi-function printer or copier by switching one or more switches on the device (or on the system boards themselves). The user then scans sheets of preprinted paper through the printer's scanner. The scanner has, or is operatively connected to, a processor that interprets as data the bitmapped images (or raster data) read by the scanner. This data is then used by the processor to reprogram the PROMs or is fed to a second device that programs the PROMs. The entire process is automated except for the step of actually feeding the paper. After the process is complete, the switches would be put back into the normal operation mode and the system could be powered on and run with the newly programmed firmware. Furthermore, data integrity can be encapsulated in the data using simple checksums. Data security could be added by encrypting the data.

Figure 1:
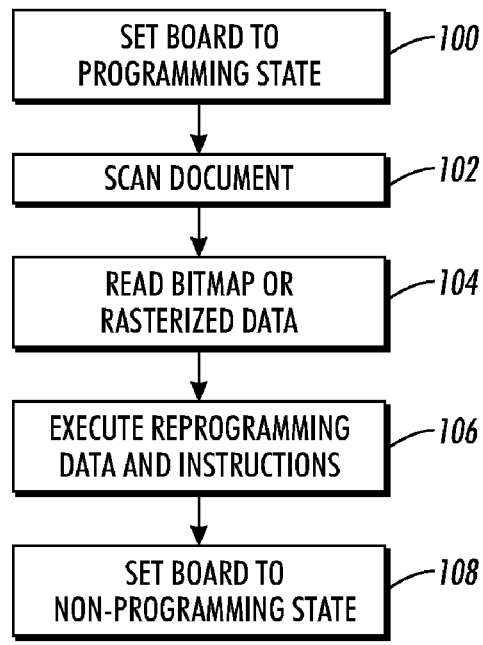
FIG. 1 is a flow diagram illustrating an embodiment herein.

As shown in flowchart form in FIG. 1, (which can comprise methods, services, computer programs, etc.) the process first sets at least one integrated circuit board (that has the programmable elements) to a programming state in item 100. The programmable elements can comprise any hardware adapted to maintain logical instructions and/or data, such as the PROMs, EEPROMs, SEEPROMs, etc. that are mentioned above. When such programmable elements are set to the programming state, they are capable of being changed. The changes made to the programmable elements alter the logical instructions and data that the programmable elements store or represent.

Once the programmable elements are set to be changed, at least one printed sheet is scanned, in item 102. The scanning can be preformed using any scanner that is operatively connected to the integrated circuit board through, for example, a processor. Again, the printed data (e.g., the barcodes, or glyphs, or other computer-only readable markings) on the printed sheet comprises the reprogramming data. With respect to computer-only readable markings, see U.S. Patent Publications 2006/0043203 and 2006/0274952, the complete disclosures of which are incorporated herein by reference. No detailed discussion of such computer-only readable markings is included herein to maintain focus on the details of the embodiments herein and, instead, reference is made to such other disclosures.

In item 104, the processor reads the barcodes or glyphs from the bitmap or rasterized data generated by the scanner and, in item 106, executes the reprogramming data to change the logical instructions and data maintained within the programmable elements. This "executing" of the reprogramming data in item 106 comprises physically or electrically altering the programmable elements to remove previously stored logical instructions and data from the programmable elements and to install different logical instructions and data in the programmable elements. After the programmable elements are reprogrammed, the integrated circuit board is deactivated and set to a non-programming state in item 108.

Figure 2:
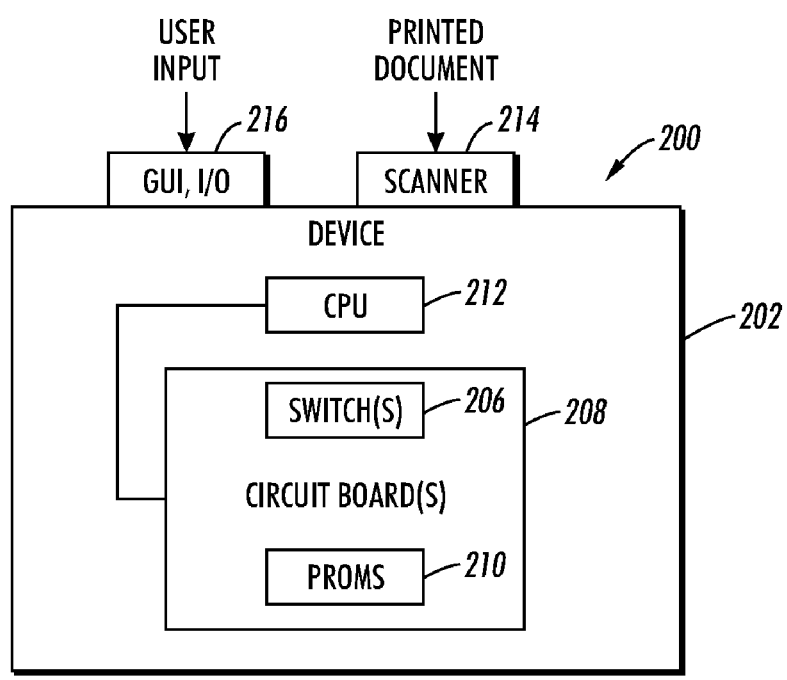
FIG. 2 is a schematic representation of a system according to an embodiment herein.

An apparatus embodiment 200 shown in FIG. 2 includes any form of device that may have the need for firmware updates, such as a printer, copier, or multifunction device 202. However, the "device" 202 is not limited to printing devices, but instead comprises any device that can accept firmware updates and includes or can be connected to a scanner 214. For example, device 202 can comprise a computer or computing device as well as any form of printer, copier, multi-function device, etc.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Stamford, Conn., USA and Hewlett Packard Company, Palo Alto Calif., USA. Such printers commonly include input/output, power supplies, processors, media movement devices, marking devices etc., the details of which are omitted herefrom to allow the reader to focus on the salient aspects of the embodiments described herein.

Computers that include input/output devices, random access and read only memories, processors, etc. are readily available devices produced by manufactures such as International Business Machines Corporation, Armonk N.Y., USA and Apple Computer Co., Cupertino Calif., USA. Such computers commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Stamford, Conn., USA and Visioneer, Inc. Pleasanton, Calif., USA and the details of such devices are not discussed herein for purposes of brevity and reader focus.

At least one integrated circuit board 208 within the device 202 has programmable read only memory elements 210. The programmable elements 210 can comprise any hardware adapted to maintain at least one of logical instructions and data, such as the PROMs, EEPROMs, SEEPROMs, etc. Any form of central processing unit (CPU) or processor 212 is included as part of (or operatively connected to) the integrated circuit board(s) 208. Thus, the processor 212 is operatively connected to the programmable read only memory elements 210 and the scanner 214. One or more switches 206 are included on the board 208 or are operatively connected to the processor 212. Alternatively, the switches can be included within some form of graphic user interface or input/output 216. The switches 206 are adapted to set the programmable read only memory elements 210 to either a programming or non-programming state.

Consistent with the method described above, the scanner 206 scans at least one printed sheet that contains the printed items that comprise reprogramming data. As used herein, the printed document comprises a tangible object that includes markings (barcodes, glyphs, micro printing) on physical sheets (printing media) that are capable of being read and/or recognized only by machines. The printed publication is contrasted with an electronic document that is stored on some form of electronic media (as charges, etc.) that can be read by only by a machine. The processor 212 is adapted to read the reprogramming data obtained from the scanner's 214 scan of the printed document and change the logical instructions and data maintained within the programmable read only memory elements 210 based on the reprogramming data. When changing the logical instructions and data, the processor 212 is adapted to physically alter the programmable read only memory elements 210 to remove previously stored logical instructions and data from at least one of the programmable elements and to install different logical instructions and data in the programmable elements.

With respect to use of embodiments herein, in one example, assume that 50 copiers are ready to be shipped to a highly sensitive customer; however, it is discovered that there is a problem with the boards that can be rectified by updating the firmware on 10 electrical boards in each of the copiers. In response, a large number of engineers could be assigned for weeks to re-program and test the 500 electrical boards in a lab and reinstall them in the copiers. If the copiers had already been shipped, the boards would have to be sent to the customer's site, along with a sufficient number of engineers to remove the boards from the 50 machines and replace them with the reprogrammed boards. However, with embodiments herein all 500 boards could be easily reprogrammed by scanning ten 8½×11 inch sheets (that are specially coded) to reprogram the ten PROM boards in each copier either in the warehouse or at the customer's site.

The embodiments disclosed herein reduce the number of person/hours needed to reconfigure machines, reduce the engineering and testing efforts, reduce the planning time needed to coordinate how to reprogram PROM boards, increase flexibility, and reduce the cost for configuration changes. With embodiments herein, no network is required because firmware updates can be distributed in any page description language (PDL, i.e., portable document format (PDF), printer control language (PCL), tagged image file format (TIFF), etc.). Firmware updates can also be made to machines without external media (i.e. universal serial bus (USB) ports, compact disk read only memory (CD ROM) drives, etc.) so long as the machines have (or can be connected to) scanners. Further, these embodiments allow generic machines to be reprogrammed on the fly. Also, implementation of the embodiments herein can be accomplished by personnel that do not have experience with reprogramming PROMs because one only needs to operate a switch and scan paper to accomplish the reprogramming and the embodiments do not require an understanding of how the PROM device works.

All foregoing embodiments are specifically applicable to electrostatographic and/or xerographic machines and/or processes as well as to software programs stored on the electronic memory (computer usable data carrier within the CPU 212), and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
   setting at least one integrated circuit board having firmware programmable elements to a programming state, wherein said firmware programmable elements comprise hardware adapted to maintain firmware logical instructions;
   scanning at least one printed sheet using a scanner operatively connected to said integrated circuit board, wherein printed data on said printed sheet comprises reprogramming data;
   changing said firmware logical instructions maintained within said firmware programmable elements in said integrated circuit board using said reprogramming data while said scanner is prevented from being in communications with any other device; and
   obtaining different firmware logical instructions from said printed data,
   wherein said changing of said firmware logical instructions comprises altering said firmware programmable elements to remove previously stored firmware logical instructions from at least one firmware programmable element of said firmware programmable elements and to install said different firmware logical instructions in said at least one firmware programmable element.

2. The method according to claim 1, wherein said printed data comprises computer-readable markings.

3. The method according to claim 1, wherein said printed data comprises one of bar codes, glyphs, and graphical items.

4. The method according to claim 1, further comprising setting said integrated circuit board to a non-programming state after performing said changing of said firmware logical instructions.

5. A method comprising:
   setting at least one integrated circuit board having firmware programmable elements to a programming state, wherein said firmware programmable elements comprise hardware adapted to maintain firmware logical instructions;
   scanning at least one printed sheet using a scanner operatively connected to said integrated circuit board through a processor, wherein printed data on said printed sheet comprises reprogramming data;
   reading said reprogramming data using said processor;
   executing said reprogramming data using said processor to change said firmware logical instructions maintained within said firmware programmable elements in said integrated circuit board while said scanner is prevented from being in communications with any other device; and
   obtaining different firmware logical instructions from said printed data,
   wherein said executing of said reprogramming data comprises altering said firmware programmable elements to remove previously stored firmware logical instructions from at least one firmware programmable element of said firmware programmable elements and to install said different firmware logical instructions in said at least one firmware programmable element.

6. The method according to claim 5, wherein said printed data comprises computer-readable markings.

7. The method according to claim 5, wherein said printed data comprises one of bar codes, glyphs, and graphical items.

8. The method according to claim 5, further comprising deactivating said integrated circuit board to a non-programming state after performing said changing of said firmware logical instructions.

9. An apparatus comprising:
   at least one integrated circuit comprising firmware programmable elements, wherein said firmware programmable elements comprise hardware that maintains firmware logical instructions;
   a processor operatively connected to said firmware programmable elements;
   at least one switch operatively connected to said processor, wherein said switch sets said firmware programmable elements to a programming state; and
   a scanner operatively connected to said processor;
   wherein said scanner scans at least one printed sheet,
   wherein printed data on said printed sheet comprises reprogramming data,
   wherein, in response to activation of said switch, said processor reads said reprogramming data and changes said firmware logical instructions maintained within said firmware programmable elements in said integrated circuit board based on said reprogramming data while said scanner is prevented from being in communications with any other device,
   wherein said processor obtains different firmware logical instructions from said printed data,
   wherein when changing said firmware logical instructions, said processor alters said firmware programmable elements to remove previously stored firmware logical instructions from at least one firmware programmable element of said firmware programmable elements and installs said different firmware logical instructions in said at least one firmware programmable element.

10. The apparatus according to claim 9, wherein said printed data comprises computer-readable markings.

11. The apparatus according to claim 9, wherein said printed data comprises one of bar codes, glyphs, and graphical items.

12. The apparatus according to claim 9, wherein said switch is further adapted to set said integrated circuit board to a non-programming state.

13. An apparatus comprising:
   at least one integrated circuit board comprising firmware programmable read only memory elements, wherein said firmware programmable read only memory elements comprise hardware that maintains firmware logical instructions;
   a processor on said integrated circuit board, wherein said processor is operatively connected to said programmable read only memory elements;
   at least one switch operatively connected to said processor, wherein said switch sets said
   programmable read only memory elements to a programming state; and
   a scanner operatively connected to said processor;
   wherein said scanner scans at least one printed sheet, wherein printed data on said printed sheet comprises reprogramming data,
   wherein, in response to activation of said switch, said processor reads said reprogramming data and changes said firmware logical instructions maintained within said programmable read only memory elements in said integrated circuit board based on said reprogramming data while said scanner is prevented from being in communications with any other device,
   wherein said processor obtains different firmware logical instructions from said printed data,
   wherein when changing said firmware logical instructions, said processor alters said programmable read only memory elements to remove previously stored firmware logical instructions from at least one firmware programmable element of said firmware programmable elements and installs said different firmware logical instructions in said at least one firmware programmable element.

14. The apparatus according to claim 13, wherein said printed data comprises computer-readable markings.

15. The apparatus according to claim 13, wherein said printed data comprises one of bar codes, glyphs, and graphical items.

16. A non-transitory computer-readable data storage medium storing instructions that, when executed by a computer, cause the computer to perform a method comprising:
   setting at least one integrated circuit board having firmware programmable elements to a programming state, wherein said firmware programmable elements comprise hardware adapted to maintain firmware logical instructions;
   scanning at least one printed sheet using a scanner operatively connected to said integrated circuit board, wherein printed data on said printed sheet comprises reprogramming data;
   changing said firmware logical instructions maintained within said firmware programmable elements in said integrated circuit board using said reprogramming data while said scanner is prevented from being in communications with any other device, and
   obtaining different firmware logical instructions from said printed data,
   wherein said changing of said firmware logical instructions and data comprises altering said firmware programmable elements to remove previously stored firmware logical instructions from at least one firmware programmable element of said firmware programmable elements and to install said different firmware logical instructions in said at least one firmware programmable element.

* * * * *